US012681957B2

(12) United States Patent     (10) Patent No.:     US 12,681,957 B2
Grantham et al.     (45) Date of Patent:     Jul. 14, 2026

(54) SYSTEMS AND METHODS FOR ARTIFICIAL-INTELLIGENCE-AUGMENTED DATA RETRIEVAL

(71) Applicant: WORKDAY, INC., Pleasanton, CA (US)

(72) Inventors: Nick Grantham, Dublin (IE); Chris Lee, San Francisco, CA (US); Deni Santos, Lucan (IE); Zach Preston, San Francisco, CA (US); Eric Huang, Vancouver (CA)

(73) Assignee: WORKDAY, INC., Pleasanton, CA (US)

( * ) Notice: Subject to any disclaimer, the term of this patent is extended or adjusted under 35 U.S.C. 154(b) by 0 days.

(21) Appl. No.: 18/770,732

(22) Filed: Jul. 12, 2024

(65) Prior Publication Data

US 2026/0017285 A1     Jan. 15, 2026

(51) Int. Cl.
*G06F 7/00*     (2006.01)
*G06F 16/242*     (2019.01)
*G06F 16/248*     (2019.01)
*G06F 16/28*     (2019.01)

(52) U.S. Cl.
CPC .......... *G06F 16/285* (2019.01); *G06F 16/243* (2019.01); *G06F 16/248* (2019.01)

(58) Field of Classification Search
CPC .... G06F 16/243; G06F 16/248; G06F 16/285;
G06F 16/244; G06F 16/245; G06F 16/3329; G06F 16/90332; G06F 16/90335; G06F 16/217; G06F 16/2455; G06F 16/353; G06F 40/10; G06F 40/40; G06F 40/205; G06F 40/105; G06F 40/106; G06F 40/186; G06F 40/211
See application file for complete search history.

(56) References Cited

U.S. PATENT DOCUMENTS

| | | | | |
|---|---|---|---|---|
| 10,061,843 | B2 * | 8/2018 | Hakkani-Tur ...... | G06F 16/3332 |
| 11,074,250 | B2 * | 7/2021 | Flaks .................... | G06F 16/367 |
| 12,222,935 | B2 * | 2/2025 | Laufer ................. | G06F 16/245 |
| 2025/0139088 | A1 * | 5/2025 | Weik .................... | H04L 63/102 |
| 2025/0225161 | A1 * | 7/2025 | Mabey ................. | G06N 3/0455 |

* cited by examiner

*Primary Examiner* — Mohammad A Sana
(74) *Attorney, Agent, or Firm* — James J. DeCarlo; Greenberg Traurig, LLP

(57)     ABSTRACT

A disclosed method may include receiving, via a user interface, a natural language query that describes a task. The method may also include classifying, via a classification machine learning model, the natural language query as a query type included in a predetermined plurality of query types. The method may also include generating, by the processor via a generative machine learning model pre-trained to generate responses to queries based on at least one predetermined task execution policy, a response based on the natural language query and the query type. The method may also include providing, via the user interface, the response. Various other methods, systems, and computer-readable media are also disclosed.

20 Claims, 14 Drawing Sheets

100
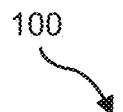
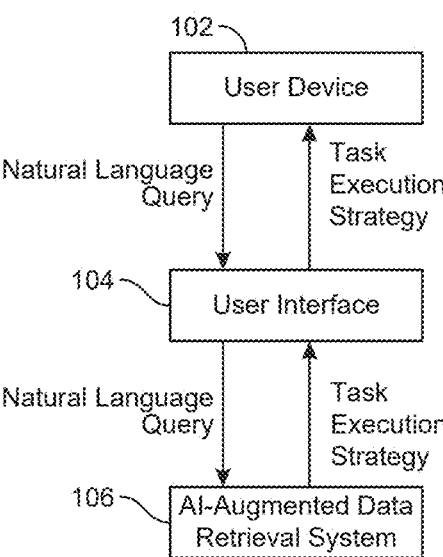
*FIG. 1*

200

300

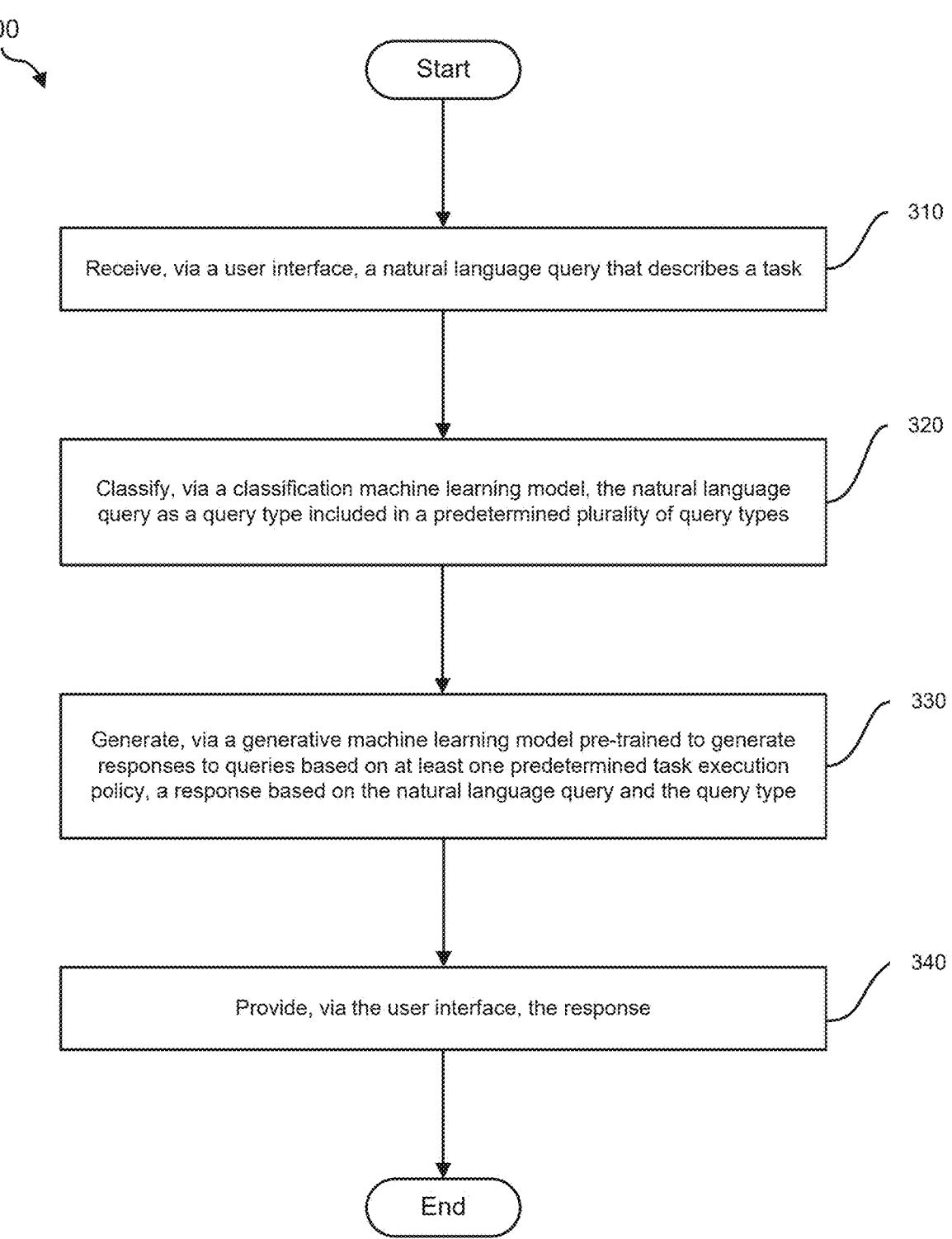

Start

310

Receive, via a user interface, a natural language query that describes a task

320

Classify, via a classification machine learning model, the natural language query as a query type included in a predetermined plurality of query types

330

Generate, via a generative machine learning model pre-trained to generate responses to queries based on at least one predetermined task execution policy, a response based on the natural language query and the query type

340

Provide, via the user interface, the response

End

*FIG. 3*

900
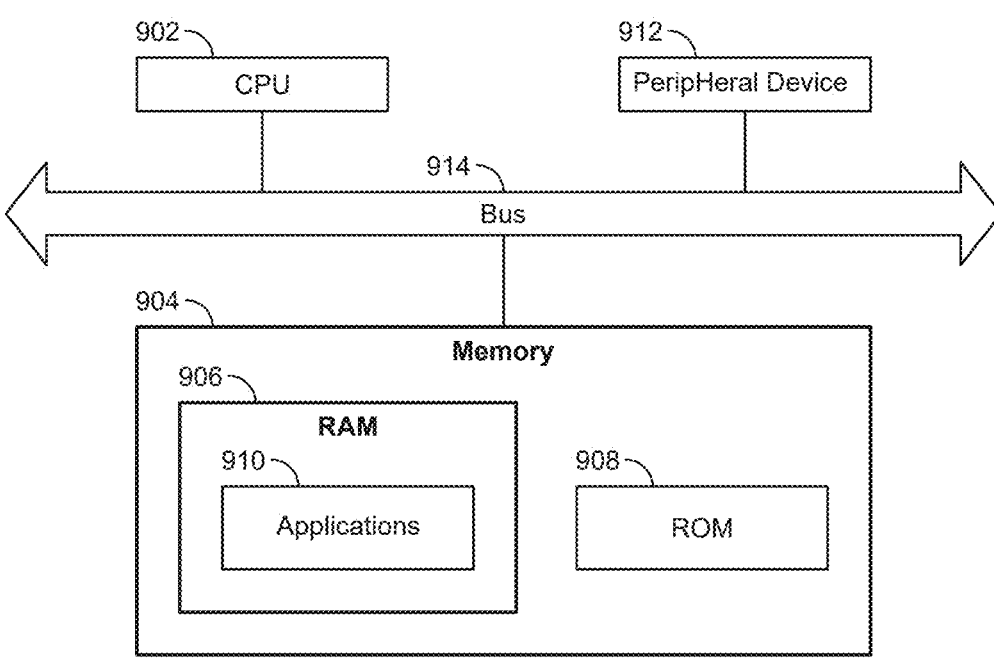
*FIG. 9*

1000

✧ Organizational Task AI

Your Ask

Show me the list of office supplies available at Example Organization offices

Related Procurement Policy

Here's the list basic office supplies provided by Example Organization.

- Pens
- Paper in various paper sizes
- Staplers, staples, paper clips, and push pins
- Shipping and packaging supplies like envelopes and tytpe
- Paper shredders
- Office stationary Your offices should be stocked with these items. If not, please reach out to the receptionist if/when the inventory will be replenished. For Other items, if you are no longer a new hire (e.g. within 6 mos of hire date), then you can purchase them on Amazon Business & expenses the items so long as your manager approval. Any items will be charged to you cost center.

Report Issue

Related Action

 Business Supplier

AI - generated content may contain inaccuracies. Please review before use. Learn More Done

*FIG. 10*

SYSTEMS AND METHODS FOR ARTIFICIAL-INTELLIGENCE-AUGMENTED DATA RETRIEVAL

BACKGROUND

Large language models (LLMs) are a class of machine learning (ML) algorithms that can predict a series of tokens given an input series of tokens. LLMs are frequently used in natural language processing (NLP) to generate text content in response to text input (referred to as a "prompt"). General-purpose models are trained on large corpora of data which adjusts the weights and influences the fidelity of the LLM's output. LLMs can be fine-tuned via additional task-specific training data or supplemented via external data sources, referred to as retrieval-augmented generation (RAG).

BRIEF DESCRIPTION OF THE FIGURES

FIG. 1 is a block diagram illustrating an artificial-intelligence-augmented (AI-augmented) data retrieval system according to some of the disclosed embodiments.

FIG. 3 is a flow diagram of an example computer-implemented system for AI-augmented data retrieval.

FIG. 9 is a block diagram of a computing device according to some embodiments of the disclosure.

FIG. 10, FIG. 11, FIG. 12, FIG. 13, and FIG. 14 illustrate interactive user interfaces for an AI-augmented data retrieval system, designed to facilitate a range of operations within an example organization's environment.

DETAILED DESCRIPTION

Figure 2:
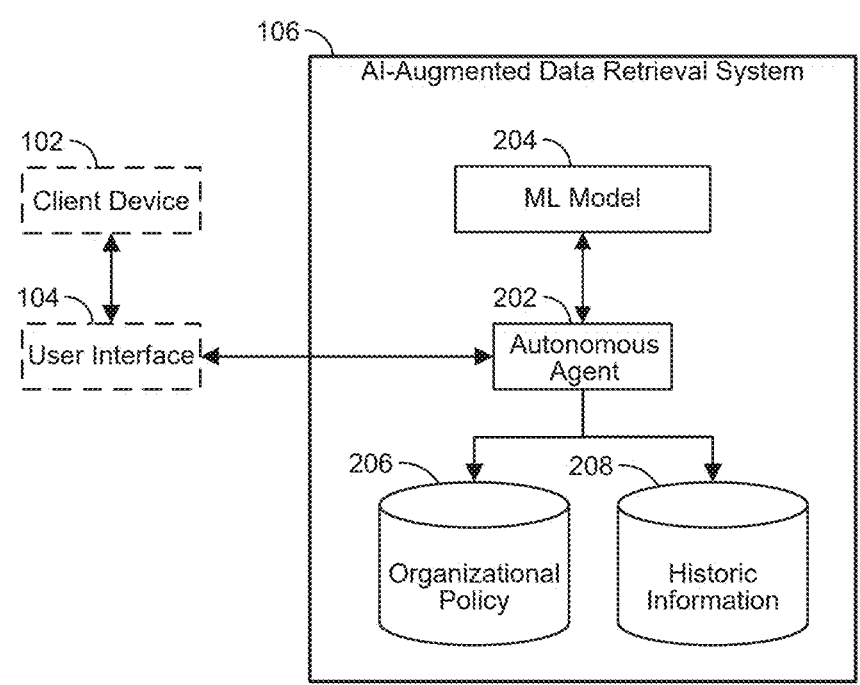
FIG. 2 is a block diagram illustrating an AI-augmented data retrieval system according to some of the disclosed embodiments.

The disclosed embodiments relate to the use of generative ML models, such as LLMs, for performing data retrieval tasks. The disclosed embodiments may describe techniques for executing real-time AI-augmented information retrieval actions within an organizational context.

In some implementations, the disclosure relates to a method including: receiving, by a processor, via a user interface, a natural language query that describes a task; classifying, by the processor, via a classification machine learning model, the natural language query as a query type included in a predetermined plurality of query types; generating, by the processor via a generative machine learning model pre-trained to generate responses to queries based on at least one predetermined task execution policy, a response based on the natural language query and the query type; and providing, by the processor via the user interface, the response.

In some implementations, the disclosure relates to a method, further including pre-training the classification machine learning model to classify natural language queries into one of a predetermined plurality of query types.

In some implementations, the disclosure relates to a method, further including classifying the natural language query as the query type by classifying the natural language query as at least one of: a routing query type; or a general query type.

In some implementations, the disclosure relates to a method, further including generating the response by selecting, based on the query type, an operation mode for the generative machine learning model from a plurality of operation modes.

In some implementations, the disclosure relates to a method, further including: selecting a routing operation mode when the natural language query is classified as a routing query type; and selecting a query-response operation mode when the natural language query is classified as a general query type.

In some implementations, the disclosure relates to a method, further including, when in the routing operation mode, selecting, via the generative machine learning model and based on the natural language query, a task execution path from a policy routing table included in the at least one predetermined task execution policy.

In some implementations, the disclosure relates to a method, further including dynamically updating the policy routing table based on received changes to the at least one predetermined task execution policy.

In some implementations, the disclosure relates to a method, further including, when in the query-response operation mode, via the generative machine learning model: processing, utilizing a retrieval-augmented generation (RAG) approach, the at least one predetermined task execution policy to generate a processed at least one predetermined task execution policy; storing the processed at least one predetermined task execution policy in a vector database; and calculating similarity scores among entries in the vector database to find relevant policy sections to answer the natural language query.

In some implementations, the disclosure relates to a method, further including updating the vector database when a new task execution policy is inputted.

In some implementations, the disclosure relates to a method, further including deploying the generative machine learning model via a centralized inference service (CIS) and an internal large language model (LLM) platform.

In some implementations, the disclosure relates to a method, further including evaluating, via the generative machine learning model, a likelihood of a selected action path resulting in a successful task execution based on the natural language query.

In some implementations, the disclosure relates to a method, further including providing the response as at least one strategy selected from a group of strategies consisting of: a task execution path, a policy explanation, and a prediction of a user's task execution requirements.

In some implementations, the disclosure relates to a method, further including configuring the user interface to receive a policy upload to provide context for the generative machine learning model.

In some implementations, the disclosure relates to a method, further including further basing generating the response on a user profile.

In some implementations, the disclosure relates to a method, further including providing a supervisory feedback interface that enables a user to provide supervisory feedback to the generative machine learning model.

In some implementations, the disclosure relates to a device including: a processor; a storage medium for tangibly storing thereon program logic for execution by the processor, the program logic including: logic, executed by the processor, for receiving a natural language query that describes a task; logic, executed by the processor, for classifying, via a classification machine learning model pre-trained to classify natural language queries into one of a predetermined plurality of query types, the natural language query as a query type included in a predetermined plurality of query types; and logic, executed by the processor, for generating, via a generative machine learning model pre-trained to generate responses to queries based on at least one predetermined task execution policy, a response based on the natural language query and the query type.

In some implementations, the disclosure relates to a device, further including logic, executed by the processor, for generating the response by selecting, based on the query type, an operation mode for the generative machine learning model by: selecting a routing operation mode when the natural language query is classified as a routing query type; and selecting a query-response operation mode when the natural language query is classified as a general query type.

In some implementations, the disclosure relates to a device, further including: logic, executed by the processor, for, when in the routing operation mode, selecting, via the generative machine learning model, based on the natural language query, a task execution path from a policy routing table included in the at least one predetermined task execution policy; logic, executed by the processor, for, when in the query-response operation mode, via the generative machine learning model: processing the at least one predetermined task execution policy utilizing a retrieval-augmented generation (RAG) approach to generate a processed at least one predetermined task execution policy; storing the processed at least one predetermined task execution policy in a vector database; and calculating similarity scores among entries in the vector database to find relevant policy sections to answer the natural language query.

In some implementations, the disclosure relates to a non-transitory computer-readable storage medium for tangibly storing computer program instructions capable of being executed by a computer processor, the computer program instructions defining steps of: classifying, by a processor, via a classification machine learning model, a natural language query that describes a task as a query type included in a predetermined plurality of query types; generating, by the processor via a generative machine learning model pre-trained to generate responses to queries based on at least one predetermined task execution policy, a response based on the natural language query and the query type; and providing, by the processor via a user interface, the response.

In some implementations, the disclosure relates to a non-transitory computer-readable storage medium further including computer program instructions defining steps of generating the response by: selecting a routing operation mode for the generative machine learning model when the natural language query is classified as a routing query type; selecting a query-response operation mode for the generative machine learning model when the natural language query is classified as a general query type; when in the routing operation mode, selecting, via the generative machine learning model, based on the natural language query, a task execution path from a policy routing table included in the at least one predetermined task execution policy; when in the query-response operation mode, via the generative machine learning model: processing the at least one predetermined task execution policy utilizing a retrieval-augmented generation (RAG) approach to generate a processed at least one predetermined task execution policy; storing the processed at least one predetermined task execution policy in a vector database; and calculating similarity scores among entries in the vector database to find relevant policy sections to answer the natural language query.

In the following detailed description, numerous specific details are set forth in order to provide a thorough understanding of the disclosed subject matter. However, it will be understood by those of ordinary skill in the art that the disclosed subject matter may be practiced without these specific details. In other instances, well-known methods, procedures, components, and circuits have not been described in detail so as not to obscure the disclosure.

While the disclosure will be described with reference to various embodiments, it will be understood that these embodiments are not intended to limit the scope of the disclosure. On the contrary, the disclosure is intended to cover alternatives, modifications, and equivalents, which may be included within the spirit and scope of the disclosure as defined by the appended claims. The following detailed description, therefore, is not to be taken in a limiting sense, and the scope of the present disclosure is defined by the appended claims and their equivalents.

Various operations are described as multiple discrete steps to aid in understanding the disclosure. However, the order of description should not imply that these operations are necessarily dependent on sequence. In particular, these operations need not be performed in the order presented.

The present disclosure will now be described more fully hereinafter with reference to the accompanying figures, in which embodiments of the disclosure are shown. The disclosed subject matter may, however, be embodied in many different forms and should not be construed as limited to the embodiments set forth herein. Rather, these embodiments are provided so that this disclosure will be thorough and complete, and will fully convey the scope of the disclosed subject matter to those skilled in the art.

FIG. 1 is a block diagram illustrating an example system 100 according to some of the disclosed embodiments.

As depicted, the example system 100 includes a user device 102, a user interface 104, and an AI-augmented data retrieval system 106.

In the illustrated system, user device 102 may comprise a computing device communicatively coupled to the user interface 104. Examples of such devices could include, but are not limited to, a personal computer, a laptop, a tablet, or a mobile phone. User device 102 can be any computing device (such as that depicted in FIG. 9) that can interact with the user interface and the AI-augmented data retrieval system.

As shown in FIG. 1, user device 102 can submit natural language queries to the user interface 104. These natural language queries can describe a task or a set of tasks that the user wishes to accomplish. As described herein, execution of many tasks may be streamlined and optimized through the use of artificial intelligence and ML models to generate advice or strategies for accomplishing those tasks in accordance with predefined policies (e.g., organizational policies). The user interface 104 receives these queries and communicates them to the AI-augmented data retrieval system 106.

In the illustrated system, the AI-augmented data retrieval system 106 is connected to the user interface 104 to receive the natural language queries. In response, the AI-augmented data retrieval system 106 retrieves, generates, and/or augments a response to those queries. In some examples, the response may include or represent an action strategy for accomplishing a task. As will be described more herein, strategies, action strategies, and/or task execution strategies may refer to a set of actions or decisions that can be made to accomplish or optimize accomplishment of selected tasks, guided by the principles of the procedures or guidelines an organization predetermines to govern desired responses. In some examples, a "policy" may refer to a set of guidelines that governs the process of retrieving and/or augmenting certain types of data about an organization, or accomplishment of a task in accordance with predetermined goals, bounds, or desires of the organization. This policy outlines the procedures, rules, and directives the system is trained on to determine appropriate responses to queries of different types. This policy may reflect the organization's unique needs, goals, and values. In some examples provided in this disclosure, the organizational policy may be used to guide the retrieval, generation, and/or augmentation of responses by an AI model.

As depicted, user interface 104 transmits the generated strategy back to the user device 102.

The user interface 104 acts as an intermediary, presenting the response and/or strategy generated by the AI-augmented data retrieval system 106 to the user on their device 102. This response and/or strategy may guide the user in their tasks, providing, in response to the query, optimized actions and decisions that reflect or are encompassed within a set of predefined (e.g., organizationally defined) task execution policies.

In some implementations, the user interface 104 may also receive and present feedback from the AI-augmented data retrieval system 106, such as confirmation of tasks accomplished, error messages, or the results of executed tasks. This feedback mechanism allows the user to verify the success of the executed strategy and, if necessary, adjust their approach based on the feedback received. Further details of the system 100 are described in connection with the following figures and those details are incorporated herein.

FIG. 2 is a block diagram illustrating an AI-augmented data retrieval system (e.g., AI-augmented data retrieval system 106) according to some of the disclosed embodiments.

As illustrated, the AI-augmented data retrieval system 106 includes an autonomous agent 202, an ML model 204, an organizational policy 206, and historic information 208. The autonomous agent 202 is communicatively coupled to the ML model 204, which serves as the ML model for processing and generating responses. The ML model 204, which may be an LLM, may be capable of analyzing and learning from vast amounts of data, including task-specific and/or policy-specific information. The autonomous agent 202 is also connected to the organizational policy 206, which provides the regulatory framework for execution of tasks, ensuring that generated strategies are compliant with the organization's rules and objectives. Additionally, the autonomous agent 202 has access to historic information 208, which includes data on past task execution decisions, activities, and outcomes. This historical data helps inform the generation of task execution strategies by providing context and learning from previous experiences.

In some implementations, the ML model 204 may be part of the AI-augmented data retrieval system 106. In other implementations, the ML model 204 may include or comprise a third-party (e.g., network-connected) ML model. As discussed above in reference to FIG. 1, the AI-augmented data retrieval system 106 may receive natural language instructions from client device 102 via autonomous agent 202. The autonomous agent 202 can generate responses to transmit to client device 102 for presentation via the user interface 104.

The autonomous agent 202, as depicted in FIG. 2, functions as the core processor within the AI-augmented data retrieval system 106. This agent, a self-contained software program capable of performing tasks autonomously, interfaces between the user device 102 and the AI-augmented data retrieval system 106 through the user interface 104.

In computer programming, an "agent" can be simple or complex, designed to automate repetitive tasks or adapt to new inputs and situations using machine learning algorithms. They can operate independently or interact with other agents in multi-agent systems.

In the context of the AI-augmented data retrieval system 106, autonomous agent 202 receives natural language queries from the user device 102, interprets these queries with the aid of a machine learning model 204 and historic information 208, and generates corresponding task execution strategies. The machine learning model 204 enables the agent to learn from data and formulate optimized task execution strategies, while the historic information 208 provides past experiences to inform the decision-making process.

The autonomous agent 202 ensures that generated task execution strategies align with the organizational policy 206, facilitating compliance with the organization's rules and objectives. Thus, the autonomous agent 202 plays a crucial role in streamlining and optimizing tasks within an organizational context, generating strategies that consider both policy compliance and past successful approaches.

The ML model 204 refines the understanding of the queries by leveraging advanced natural language processing capabilities to understand the nuances of task execution and/or policy queries, decipher the intent behind the queries, and produce contextually relevant task execution strategies.

Machine learning can be understood as a subset of artificial intelligence that provides systems the ability to automatically learn and improve from experience without being explicitly programmed. This process may involve the development and application of algorithms that can learn from and make decisions or predictions based on data. Hence, ML algorithms, as used herein, may be a set of procedures or rules used by an ML model to find patterns in data and learn from them. These algorithms can be used to train a model on a dataset, enabling the model to make accurate predictions or decisions without human intervention. In some examples described herein, ML algorithms can be used to optimize tasks by learning from past or existing data and policies and making strategic recommendations.

In some examples, a "generative machine learning model" or "generative ML model" can be a type of ML model that is capable of generating new data instances that resemble the training data. These models can learn the true data distribution of the training set so as to generate new data points with some variations. In the context of this disclosure, a generative ML model may be used to create new task execution strategies based on patterns learned from historical data.

Moreover, a "natural language model" can be understood as a type of artificial intelligence model that is designed to understand, interpret, generate, and respond to human language in a way that is both grammatically and contextually appropriate. These models may be used to facilitate human-computer interaction, allowing computers to understand instructions and queries in natural language form. Hence, a "natural language query" may be a search or command expressed in everyday language. It may include or represent a type of query in which the user interacts with the system using full sentences, phrases, or questions, as opposed to keywords or specific codes. In the context of this disclosure, a natural language query may be used in the user interface to request tasks or generate strategies.

In some examples, a "large language model" or "LLM" can be understood as a specific type of generative ML model that has been trained on a vast amount of text data. Due to its extensive training, an LLM is capable of generating text that is grammatically correct and contextually coherent. These models have the ability to understand, interpret, generate, and respond to human language in a sophisticated and nuanced manner. In the context of this disclosure, an LLM may be used to streamline and optimize tasks by processing natural language queries in the user interface, understanding the intricacies of the organizational policy, and generating novel strategies based on patterns learned from historical data.

Historic data (e.g., historic information 208) can include records of previous actions, performance data, analyses, and other relevant task execution activities. This information aids the autonomous agent 202 in making data-driven decisions and in identifying patterns or best practices that can be applied to current task execution challenges.

The final output of this collaboration is a set of task execution strategies that the autonomous agent 202 communicates to the user interface 104. The user interface 104 then presents these strategies to the user on their device 102, assisting them in making informed task execution decisions. The AI-augmented data retrieval system 106, through the integration of the autonomous agent 202, the ML model 204, and the historic information 208, transforms complex task execution requirements into actionable strategies, streamlining the task execution process and enhancing decision-making efficiency.

FIG. 3 is a flow diagram of an example computer-implemented method 300 for AI-augmented information retrieval and/or generation. The steps shown in FIG. 3 may be performed by any suitable computer-executable code and/or computing system, including one or more components of system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

At step 310, one or more of the systems described herein (e.g., the AI-augmented data retrieval system 106, via its autonomous agent 202), may receive, via a user interface, a natural language query that describes a task. This may occur via a user interface, such as user interface 104, on a client device 102. The natural language query is typically generated by a user and may include a request for a product, a service, or a query about an organization's policies. For example, the natural language query could be something like, "Show me the list of office supplies available at Example Organization offices", inputted through the user interface 104 on their client device 102. The autonomous agent 202 is responsible for interpreting and processing this query in the subsequent steps.

At step 320, one or more of the systems described herein may classify, via a classification machine learning model, the natural language query as a query type included in a predetermined plurality of query types. For example, AI-augmented data retrieval system 106 may, via its autonomous agent 202 and ML model 204 (or a different, classification-focused and trained ML model), classify the natural language query as a query type, such as a routing query type or a general query type. This routing query type may impact a response generated based on the natural language query. For example, when the natural language query is classified as a routing query type, one or more of the systems described herein (e.g., autonomous agent 202) may generate the response by selecting a routing operation mode. Additionally or alternatively, when the natural language query is classified as a general query type, one or more of the systems described herein (e.g., autonomous agent 202) may select a query-response operation mode. These modes are described in greater detail below.

At step 330, one or more of the systems described herein may generate, via a generative machine learning model pre-trained to generate responses to queries based on at least one predetermined task execution policy, a response based on the natural language query and the query type. For example, AI-augmented data retrieval system 106 may, via its autonomous agent 202 and ML model 204, generate a strategy based on the received natural language query. The ML model 204 may be pre-trained to generate responses to queries based on at least one organizational policy 206, and possibly historical information 208. In this step, the ML model 204, which may be an LLM, leverages its learning from a vast amount of text data including specific information related to execution of a predetermined type or category of task. This data-driven approach allows the ML model 204 to generate an informed and contextually relevant strategy based on the initial query. Continuing with the previous example, The ML model 204, pre-trained on organizational policy 206 and historic information 208, could generate a comprehensive list of available office supplies, their quantities, and their locations within the Example Organization.

At step 340, one or more of the systems described herein may provide the generated response and/or strategy via a user interface. For example, the autonomous agent 202 may provide the generated response and/or strategy via user interface 104. The response and/or strategy is communicated back to the user on their client device 102, assisting them in making informed task execution decisions. Continuing with the above example, a strategy can include a variety of information such as recommended paths, policy explanations, or predictions of a user's requirements, which are all generated based on the initial query. Commensurately, the generated task execution strategies could be or could include a detailed report showing the list of available office supplies, their quantities, and their respective locations within the Example Organization. By following these steps, the systems disclosed herein can streamline the task execution process, enhancing decision-making efficiency and reducing the cognitive load on users.

Figure 4:
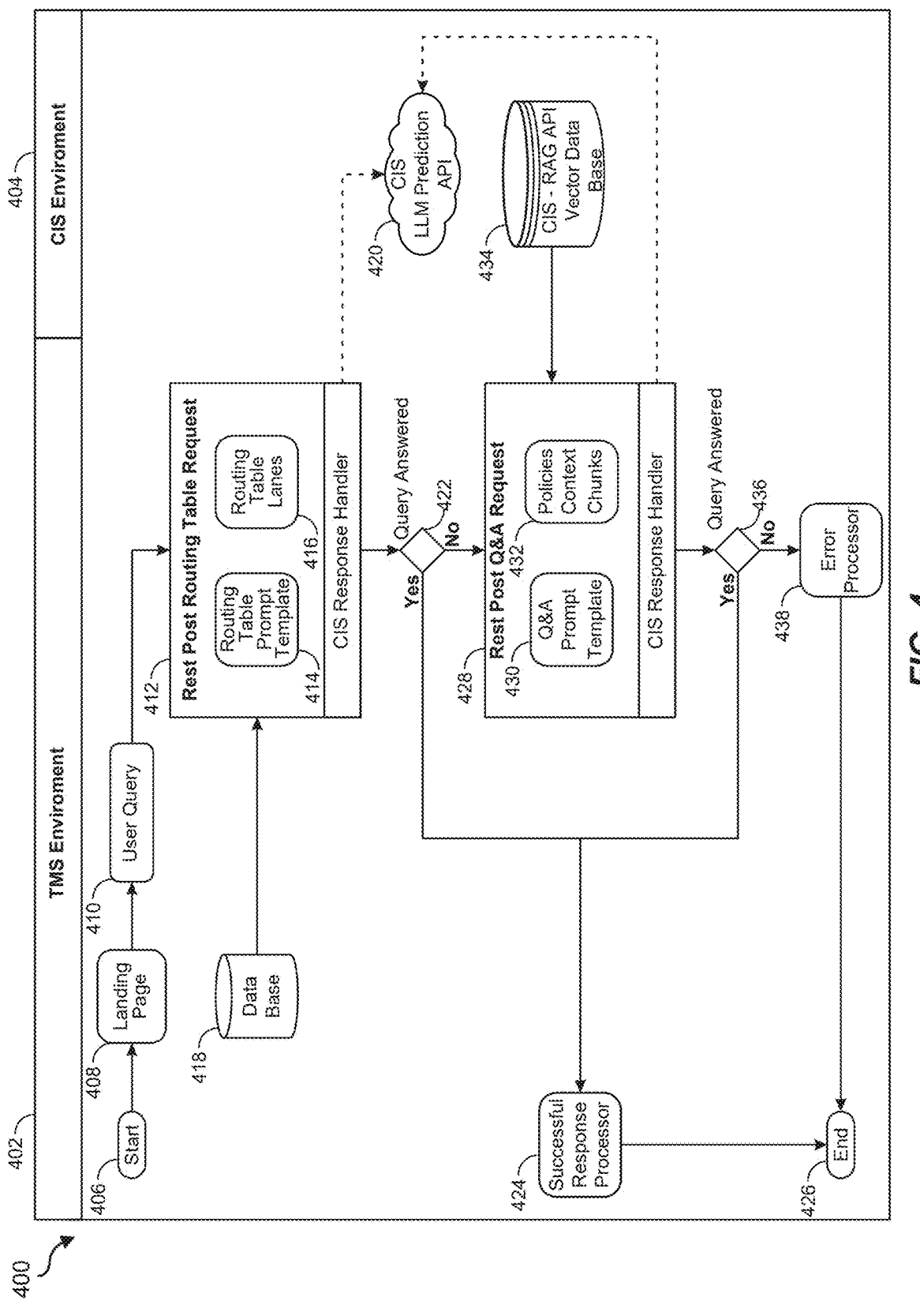
FIG. 4 presents an operational flow diagram that illustrates some operations of an implementation of an AI-augmented data retrieval system.

FIG. 4 presents an operational flow diagram 400 that illustrates some operations of an implementation of an AI-augmented data retrieval system. As shown, these operations may occur within two distinct environments: a transaction management system (TMS) environment 402 and a CIS environment 404.

The operational flow commences within the TMS environment 402 at start 406. This block signifies the initiation of the AI-augmented data retrieval process within the system. From start 406, the process moves forward to a landing page 408. This block represents the initial page that users encounter when they commence their journey within the TMS environment. The landing page can include various elements such as an input field for queries, quick links to frequently used task execution paths, and AI-generated suggestions.

The process then advances from the landing page 408 to a user query 410. This block represents the stage where the user inputs their query into the system. For example, in the context of procurement, the user query could pertain to specific items the user wishes to procure, or it could be a more general query about procurement policies or procedures.

From the user query 410, the flow progresses to a CIS response handler 412. This block represents the component of the system responsible for handling responses from the CIS environment. The CIS response handler 412 block includes a Representational State Transfer (REST) Post Routing Table Request. This REST request involves making a HTTP POST request to retrieve the necessary routing table from the CIS.

Contained within the REST POST Routing Table Request are two additional blocks: a routing table prompt template 414 and a routing table lanes 416. The routing table prompt template 414 represents the template or structure of the routing table, which helps guide the task execution process. The routing table lanes 416 signifies the different task execution paths or options available in the routing table.

Additionally, a database 418 is connected to the CIS response handler 412. Database 418 represents a system database where necessary data such as organizational policies, user information, and so forth are stored. The database 418 supports the operations of the CIS response handler 412 by providing relevant data for processing user queries and generating appropriate responses.

The CIS response handler 412 is connected to a CIS LLM prediction API 420 within the CIS environment 404. The CIS LLM prediction API 420 represents an interface used to interact with the LLM within the CIS environment. This connection signifies the system's capability to process natural language input from the user, understand its intent, and predict the most appropriate task execution path based on the user query. The CIS LLM prediction API 420 is a useful component that allows the system to understand and respond to user queries effectively, thereby ensuring a smooth and efficient action strategy identification and/or response generation process.

The CIS response handler 412 is further linked to a decision 422. This represents a decision-making point in the flow, where the system determines whether the user query has been successfully answered or not. If the query has been answered at decision 422, the flow proceeds from the decision 422 to a successful response processor 424. This block represents a part of the system that handles successful responses. It might involve providing the user with the requested information, guiding them to the next step in the task execution process, or any other appropriate response based on the user's query. The operational flow then concludes, denoted by flow continuing from successful response processor 424 to end 426.

If the query is not answered at decision 422, the flow moves to another CIS response handler 428. This block signifies a separate instance of the response handler that deals with unanswered or partially answered queries.

The CIS response handler 428 includes a REST POST Q&A Request. This request is a part of the system that sends a HTTP POST request to retrieve answers for the user's query from the system's Q&A database. Within this block are two additional components: a Q&A prompt template 430 and a policies context chunks 432 block. The Q&A prompt template 430 represents a format or structure used to receive questions from the user and/or provide answers to the user. The policies context chunks 432 block represents pieces of policy information that are relevant to the user's query and are included in the response.

The CIS response handler 428 receives input from a CIS-RAG API vector database 434 within the CIS environment 404. This database stores vectorized representations of policy data, which are used for making accurate predictions in response to user queries.

As shown, the CIS response handler 428 is connected to the CIS LLM prediction API 420 within the CIS environment 404. This connection is used to interpret and respond to the user's query based on the predictions made by the LLM.

The CIS response handler 428 block is further connected to another decision 436. This decision point is similar to decision 422, where the system determines whether the user's query has been successfully answered or not.

If the query has been answered this time, the flow proceeds from the decision 436 to the successful response processor 424, which was previously described. This signifies that the system was able to provide a satisfactory response to the user's query in this round of processing.

If the query is still not answered, the flow moves from the decision 436 to an error processor 438. This block represents the part of the system that handles scenarios where the query could not be answered, sometimes even after multiple attempts. The error processor 438 might involve providing an error message to the user, suggesting alternative queries, or directing the user to human support for further assistance.

Figure 5:
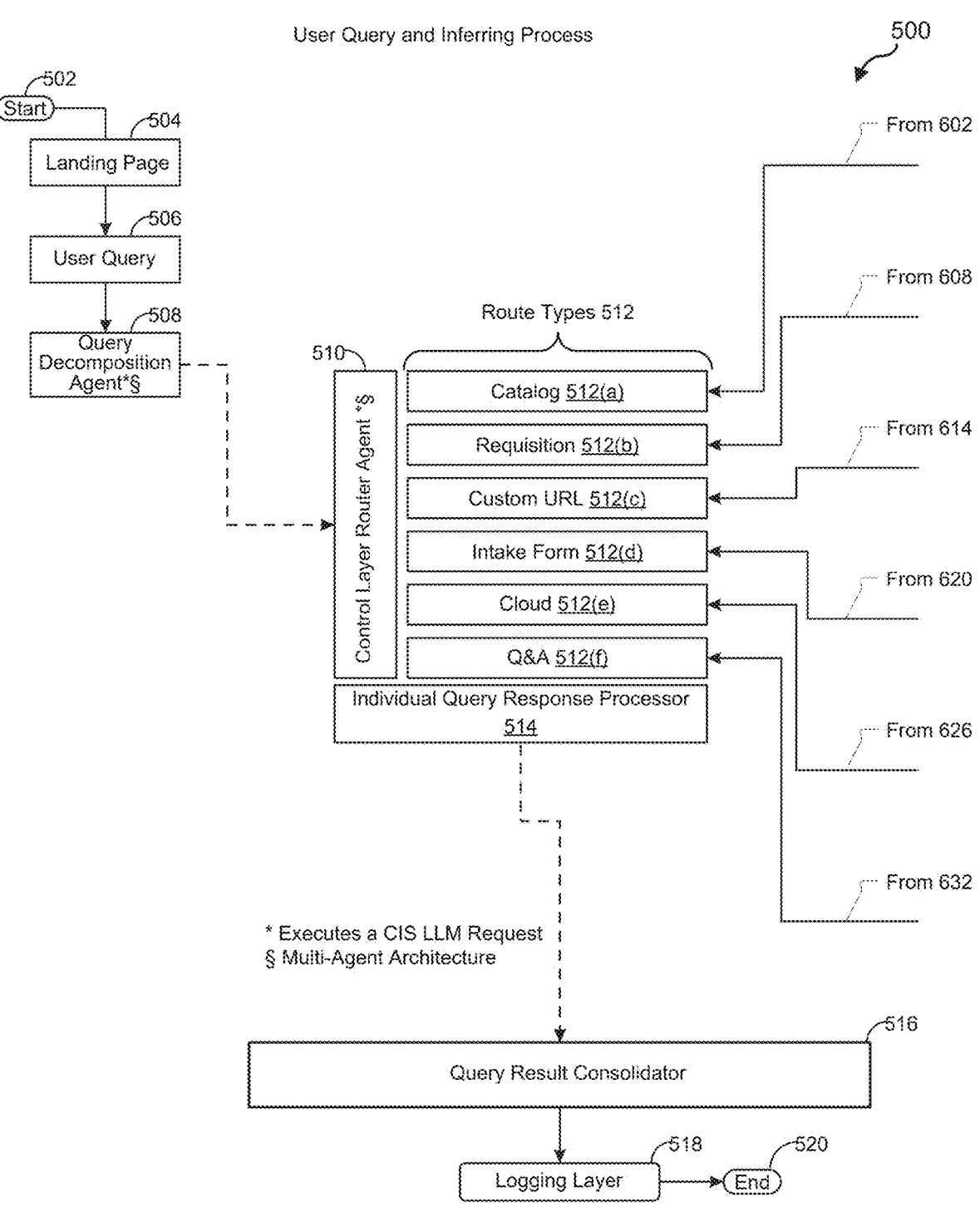
FIG. 5 illustrates an operational flow diagram that shows some elements and operations of an implementation of an AI-augmented data retrieval system.

FIG. 5 illustrates a detailed operational flow diagram 500 that shows the elements and operations of an implementation of an AI-augmented data retrieval system.

The process begins at start 502, which leads to a landing page 504. The landing page 504 serves as the initial interface for users to interact with the AI-augmented data retrieval system.

From the landing page 504, the flow advances to a user query 506. This represents a point where users may input their policy-related queries into the system.

The user query 506 is then provided as input to a query decomposition agent 508. This component represents an element of the system that breaks down the user's query into smaller parts for easier processing. It employs a multi-agent architecture and executes a CIS LLM request to understand and process the user's natural language input.

The query decomposition agent 508 includes or communicates with a control layer router agent 510. This agent is responsible for managing and directing the flow of queries to appropriate routes based on their nature. It can communicate with, consider, or include various route types 512 including, but not limited to, a catalog 512 (*a*), a requisition 512 (*b*), a custom URL 512 (*c*), an intake form 512 (*d*), a cloud route type 512 (*e*), and/or a Q&A route type 512 (*f*). Each of these route types can be provided by or communicatively connected to a respective agent as shown in, and described in greater detail below in reference to, FIG. 6.

The control layer router agent 510 is linked to an individual query response processor 514. This component is responsible for processing the responses for each individual query and preparing them for consolidation.

The individual query response processor 514 is connected to or communicates with a query result consolidator 516. This component consolidates the processed responses from the individual query response processor 514 into a format that can be easily presented to the user.

The flow continues from the query result consolidator 516 to a logging layer 518, which logs the details of the process for audit, analysis, or troubleshooting purposes.

Finally, the process concludes at the end 520 block after the consolidated response has been logged and is ready to be presented to the user.

Figure 6:
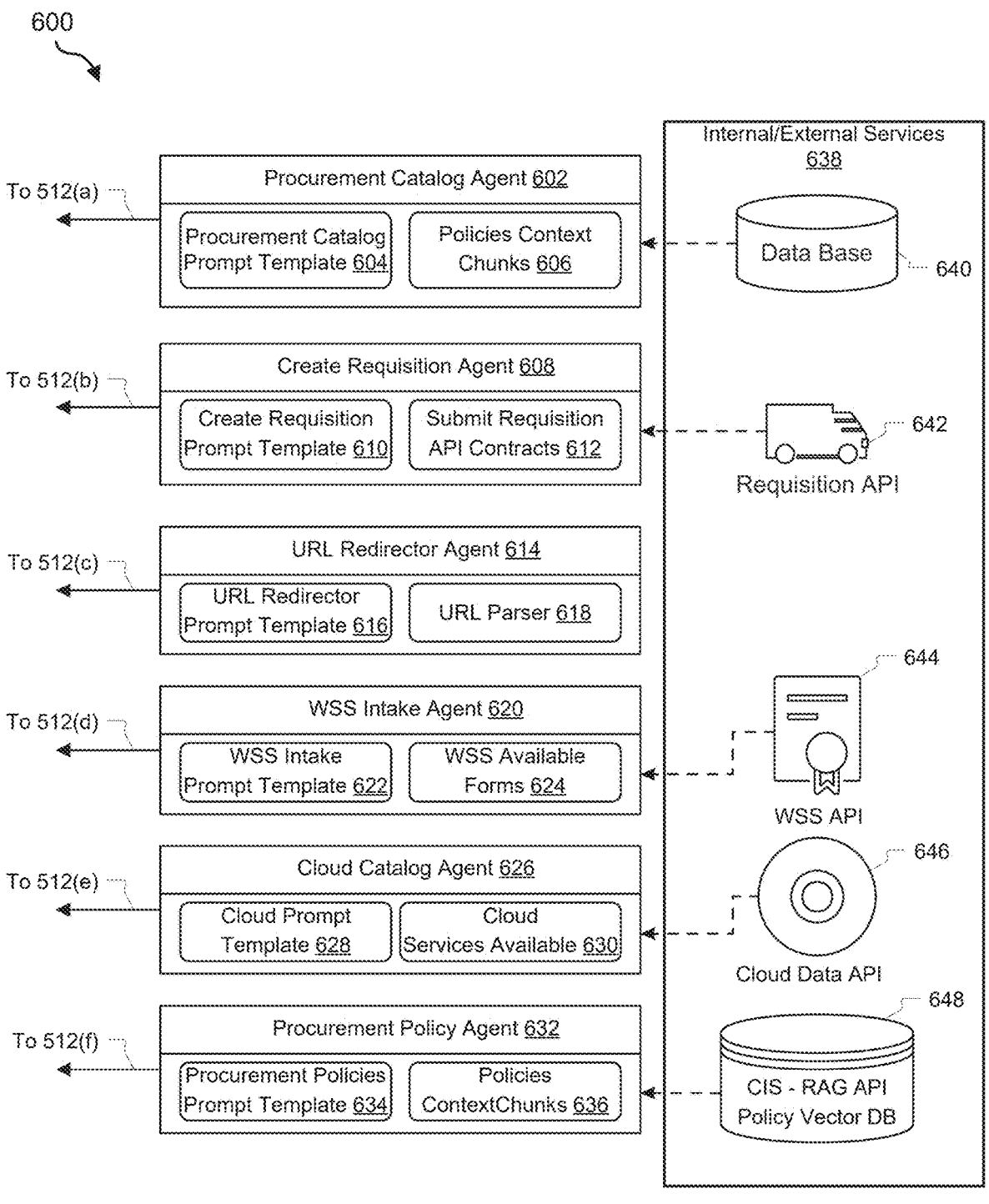
FIG. 6 provides a more detailed view of the various agents involved in the AI-augmented data retrieval system depicted in FIG. 5.

FIG. 6 provides a more detailed view of the various agents involved in the AI-augmented data retrieval system depicted in FIG. 5 within a procurement context. Each agent corresponds to a specific route type and has different roles and responsibilities within the system.

Procurement catalog agent 602 uses a procurement catalog prompt template 604 to guide actions related to the procurement catalog. it also utilizes policies context chunks 606, which represent pieces of information or rules that may impact the procurement process. this agent may execute a CIS LLM request and may implement a unique multi-agent architecture.

The create requisition agent 608 uses a create requisition prompt template 610 for creating requisitions. it interacts with submit requisition API contracts 612, which provide the specifications or agreements for programmatically submitting requisitions.

URL redirector agent 614 employs a URL redirector prompt template 616 to manage URL redirection requests and uses a URL parser 618 to interpret and break down URLs into manageable components.

Intake agent 620 uses an intake prompt template 622 for handling intake forms or requests specific to a support services provider (e.g., Workday Strategic Sourcing). It accesses available forms 624, a repository of forms available for intake processes.

Cloud catalog agent 626 utilizes a cloud prompt template 628 for creating or requesting items from a cloud catalog via a cloud data API (e.g., cloud data API 46). It also interacts with cloud services available 630, a database or list of available services in or through the cloud catalog.

Policy agent 632 employs a procurement policies prompt template 634 related to procurement policies. It also interacts with policies context chunks 636, which includes "chunks" of information included in a vector database (e.g., CIS-RAG API Policy Vector DB 648) concerning procurement policies.

The flowchart 600 also shows internal/external services 638, representing the broader ecosystem of services and APIs that the agents interact with.

Database 640 is a central repository for storing data. As shown, procurement catalog agent 602 may receive data from this database.

Requisition API 642 is an interface for managing requisitions. Create requisition agent 608 may receive data from or through this API.

The intake API 644 may be specific to a particular support services provider (e.g., Workday Strategic Sourcing), and the intake agent 620 may interact with this API.

The cloud data API 646 may be used to access or manage data stored in the cloud.

The CIS-RAG API Policy Vector DB 648 represents an important component of the AI-augmented data retrieval system, particularly interacting with the policy agent 632, as shown in FIG. 6.

As noted above, CIS stands for Centralized Inference Service, a service within the system that processes and interprets user queries. RAG, or Retrieval-Augmented Generation, is an ML model that combines the retrieval of relevant documents with a sequence generation model. It is designed to enhance the system's ability to generate responses to user queries by pulling from a broader base of information.

The CIS-RAG API is an interface that allows the policy agent 632 to communicate with the CIS via a RAG methodology. This API enables the agent to submit user queries that may include retrieved information and receive the processed and interpreted results from the CIS.

The policy vector DB part of the component refers to a policy vector database. This represents a database storing vector representations of policies. In the context of ML, vector representations are often used to encode and store complex data in a format that can be easily understood and processed by ML models.

In an AI-augmented data retrieval system, a policy vector DB can store policies in a vector format that can be processed by the RAG and other ML models within the system. Policy agent 632 may interact with this database to access these vectorized policies when processing user queries.

Figure 7:
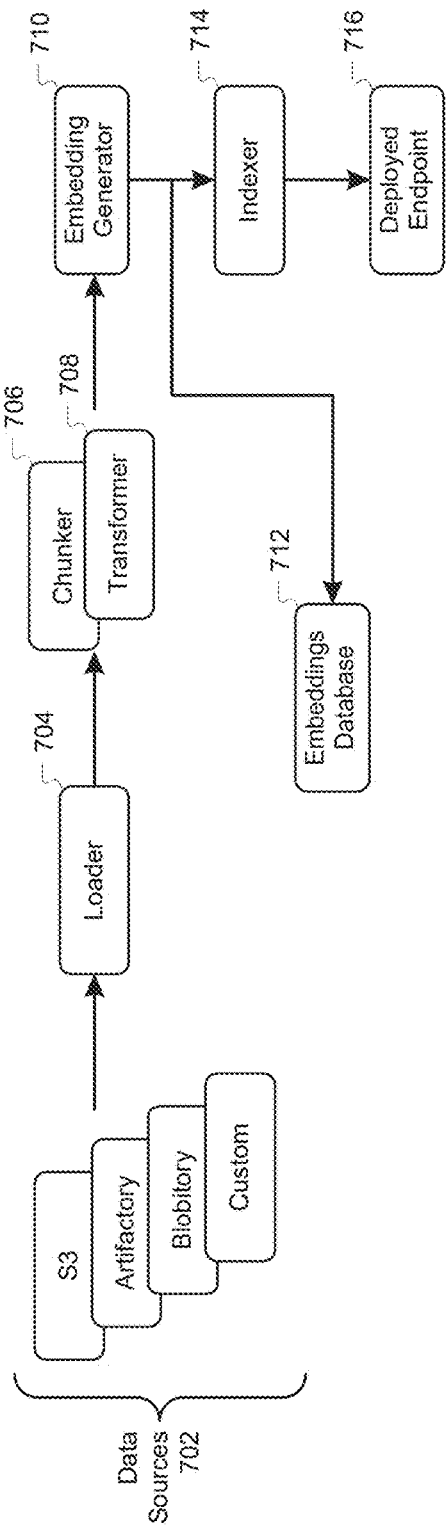
FIG. 7 provides a flowchart that illustrates a systematic training process for a RAG-based LLM.

FIG. 7 provides a flowchart 700 that illustrates a systematic training process for a RAG-based LLM. This schematic represents a configuration of components structured to facilitate the ingestion, transformation, vectorization, and indexing of data, culminating in the deployment of an endpoint for the LLM tool.

Starting at the left of FIG. 7, a group of data sources, indicated collectively as data sources 702, provide raw input for the system. This group includes an assortment of data storage services that are potential repositories for the data needed by the LLM. Specifically, the storage services include Amazon Simple Storage Service (S3), which is a scalable object storage service; Artifactory, a repository manager that supports software development artifacts; Blobitory, which represents a generic blob or object storage service; and Custom, which indicates bespoke or proprietary data storage solutions tailored to the specific needs of the system.

The raw data from data sources 702 is then conveyed to a loader 704, responsible for the initial stage of data ingestion. Loader 704 acts as a data retrieval mechanism that sources and transmits data from data sources 702 to the subsequent processing stages.

Upon retrieval, the data is delivered to chunker 706 and transformer 708. Chunker 706 may segment the ingested data into smaller, more manageable pieces or "chunks," while transformer 708 may convert these chunks into a format suitable for further processing and analysis.

From chunker 706 and transformer 708, the data progresses to an embedding generator 710. This component is tasked with converting the formatted data chunks into dense vector representations, commonly referred to as embeddings. These embeddings capture the semantic and contextual nuances of the data, allowing for more sophisticated data handling and manipulation. The generated embeddings are stored in an embeddings database 712, which serves as a repository for these vectors, facilitating efficient retrieval for downstream tasks.

Indexer 714 receives the embeddings from embedding generator 710 and embeddings database 712. The indexer 714 systematically organizes the embeddings, creating an optimized structure for quick searching and retrieval, which may be helpful for some mechanisms of the LLM.

Finally, the process results in a deployed endpoint 716, which may represent the interface through which the trained LLM can be accessed. The deployed endpoint 716 may serve as a point of interaction for end-users or external systems to query the LLM, utilizing the indexed embeddings to retrieve information and generate responses.

This depicted configuration facilitates the creation of a RAG model that leverages the deep semantic understanding encoded within the embeddings to enhance the language generation capabilities of the LLM. The integration of these components into the described system architecture supports the training of a sophisticated, responsive, and accurate LLM tool.

Figure 8:
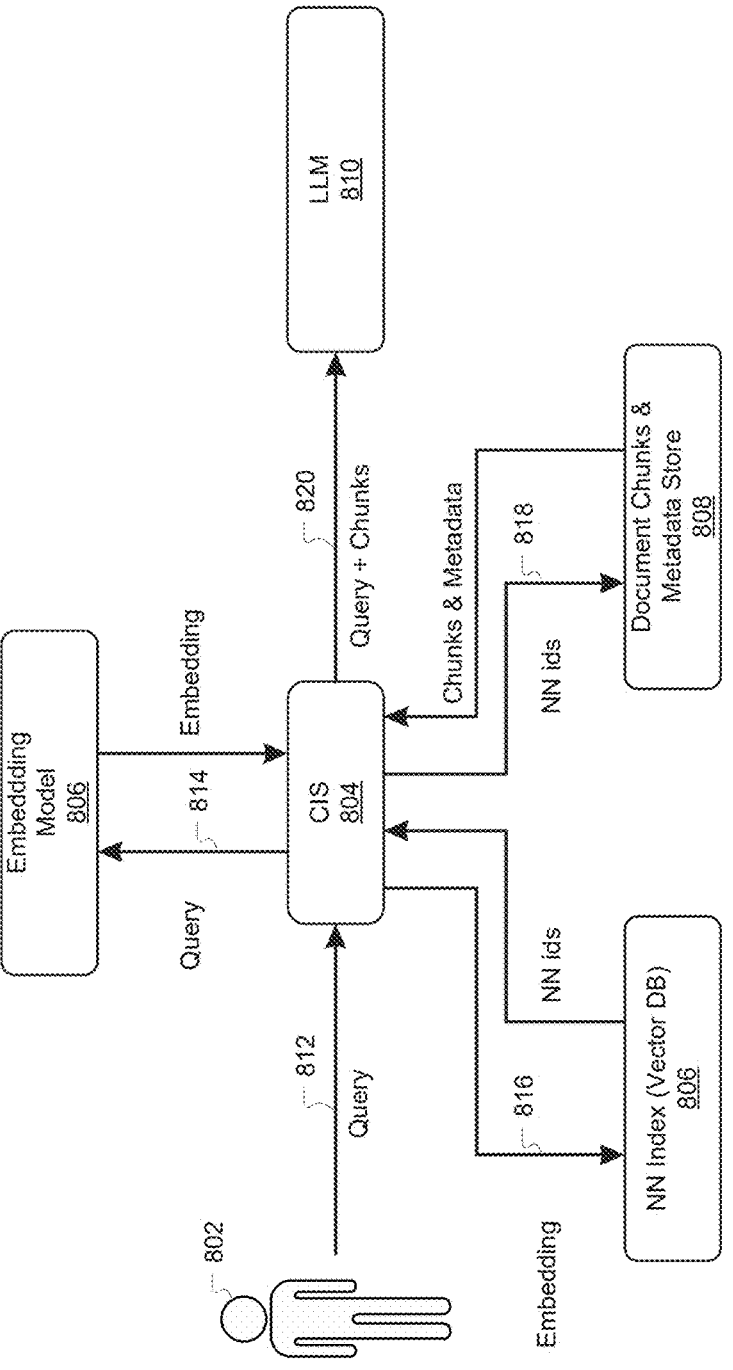
FIG. 8 is a schematic illustration of an exemplary operational framework for employing a RAG-based LLM via a Centralized Inference Service (CIS).

FIG. 8 is a diagram 800 of an exemplary operational framework for employing a RAG-based LLM via a CIS. The framework outlines the sequential interaction between the user, the CIS, and the LLM, augmented by a vector database and a document store.

At the outset of the process in Step 812, a user 802 inputs a query into the system. This query constitutes the initial data upon which subsequent retrieval and generation processes are predicated.

In Step 814, the CIS 804 receives the user's query. The CIS provides a sophisticated coordination mechanism designed to facilitate the processing of queries and orchestrates the flow of data through the RAG-based system.

Concurrently, the query is propagated to an embedding model 806, wherein the query is encoded into a high-dimensional vector space, resulting in an embedding. This vectorized representation encapsulates the semantic intent of the query, essential for the retrieval process.

Proceeding to Step 816, the derived embedding is utilized by a nearest neighbor (NN) index within a vector database (vector DB) 806. The vector DB executes a retrieval operation identifying the most semantically proximate document representations, referred to as "NN ids", which are essentially indices of the closest data points within the embedding space.

Subsequently, in Step 818, the NN ids are utilized to access a document chunks and metadata store 808. This store is a repository of data chunks, along with their associated metadata, which are contextually relevant to the user's query as determined by the NN ids. This step ensures that the query is supplemented with pertinent information from the document store.

Finally, in Step 820, the CIS 804 amalgamates the original query with the retrieved data chunks and metadata, forwarding this enriched data composite to the LLM 810. The LLM integrates this information to generate a response that not only reflects the user's immediate query but also incorporates comprehensive contextual knowledge retrieved via the RAG mechanism.

FIG. 8 encapsulates the integration of retrieval and augmentation methodologies within an LLM framework, enhancing the model's capacity to produce responses that are both contextually relevant and semantically rich. This illustrative embodiment demonstrates an advanced approach to natural language processing, leveraging the synergy of retrieval-based augmentation within a centralized service model for large-scale language understanding and generation tasks.

FIG. 9 is a block diagram 900 of a computing device according to some embodiments of the disclosure.

As illustrated, the device includes a processor or central processing unit (CPU) such as CPU 902 in communication with a memory 904 via a bus 914. The device also includes one or more input/output (I/O) or peripheral devices 912. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 902 may comprise a general-purpose CPU. The CPU 902 may comprise a single-core or multiple-core CPU. The CPU 902 may comprise a system-on-a-chip (SoC) or a similar embedded system. In some embodiments, a graphics processing unit (GPU) may be used in place of, or in combination with, a CPU 902. Memory 904 may comprise a memory system including a dynamic random-access memory (DRAM), static random-access memory (SRAM), Flash (e.g., NAND Flash), or combinations thereof. In one embodiment, the bus 914 may comprise a Peripheral Component Interconnect Express (PCIe) bus. In some embodiments, the bus 914 may comprise multiple busses instead of a single bus.

Memory 904 illustrates an example of a non-transitory computer storage media for the storage of information such as computer-readable instructions, data structures, program modules, or other data. Memory 904 can store a basic input/output system (BIOS) in read-only memory (ROM), such as ROM 908 for controlling the low-level operation of the device. The memory can also store an operating system in random-access memory (RAM) for controlling the operation of the device.

Applications 910 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 906 by CPU 902. CPU 902 may then read the software or data from RAM 906, process them, and store them in RAM 906 again.

The device may optionally communicate with a base station (not shown) or directly with another computing device. One or more network interfaces in peripheral devices 912 are sometimes referred to as a transceiver, transceiving device, or network interface card (NIC).

An audio interface in peripheral devices 912 produces and receives audio signals such as the sound of a human voice. For example, an audio interface may be coupled to a speaker and microphone (not shown) to enable telecommunication with others or generate an audio acknowledgment for some action. Displays in peripheral devices 912 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 912 may comprise any input device arranged to receive input from a user. An illuminator in peripheral devices 912 may provide a status indication or provide light. The device can also comprise an input/output interface in peripheral devices 912 for communication with external devices, using communication technologies, such as USB, infrared, Bluetooth®, or the like. A haptic interface in peripheral devices 912 provides tactile feedback to a user of the client device.

A GPS receiver in peripheral devices 912 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

FIG. 10 through FIG. 14 illustrate potential views of user interfaces with which users and/or administrators may interact. These views are provided for illustrative purposes only and are not intended to limit this disclosure to particular or specific interface designs, elements, configurations, and so forth. By way of illustration, some of these non-limiting examples illustrate certain elements within a procurement context.

FIG. 10 illustrates a user interface view 1000, showcasing a strategy output generated by the AI-augmented data retrieval system designed for an Example Organization.

At the top of the interface in the "Organizational Task AI" section, a prompt acknowledges the user's request: "Show me the list of office supplies available at Example Organization offices." This demonstrates that the system has processed a user's natural language query and is presenting a tailored response.

The main body of the interface displays the "Related Policy," which outlines a list of basic office supplies provided by the Example Organization. This includes standard office necessities such as pens, paper in various sizes, staplers and staples, shipping supplies, paper shredders, and office stationery. The structured list gives users an immediate overview of the available office supplies, ensuring they understand the range of items they can requisition.

Additionally, the interface provides procedural guidance. It advises that office spaces should be stocked with these items and instructs users on the appropriate steps to take if supplies are low. These steps could involve contacting the receptionist or procuring through Amazon Business with manager approval.

A "Report Issue" function is incorporated, allowing users to alert the system or responsible personnel about any discrepancies or issues with the office supply inventory. The "Related Action" section offers a direct link to "Amazon Business," indicating an established partnership for the procurement of supplies and providing a streamlined process for employees to make necessary purchases.

Finally, a disclaimer at the bottom of the interface cautions users that "AI-generated content may contain inaccuracies," advising them to review the information before use. This statement highlights the system's integration of artificial intelligence and the ongoing need for human oversight.

The user interface view 1000 provides an interactive and informative experience, employing AI to assist with strategy and policy dissemination. The design aims to increase efficiency in procurement-related tasks by offering a centralized and automated solution to address users' policy-related informational needs within the Example Organization. This view exemplifies a practical application of AI in streamlining the procurement process and represents the innovative approaches taken by the Example Organization to enhance workplace productivity and resource management.

Figure 11:
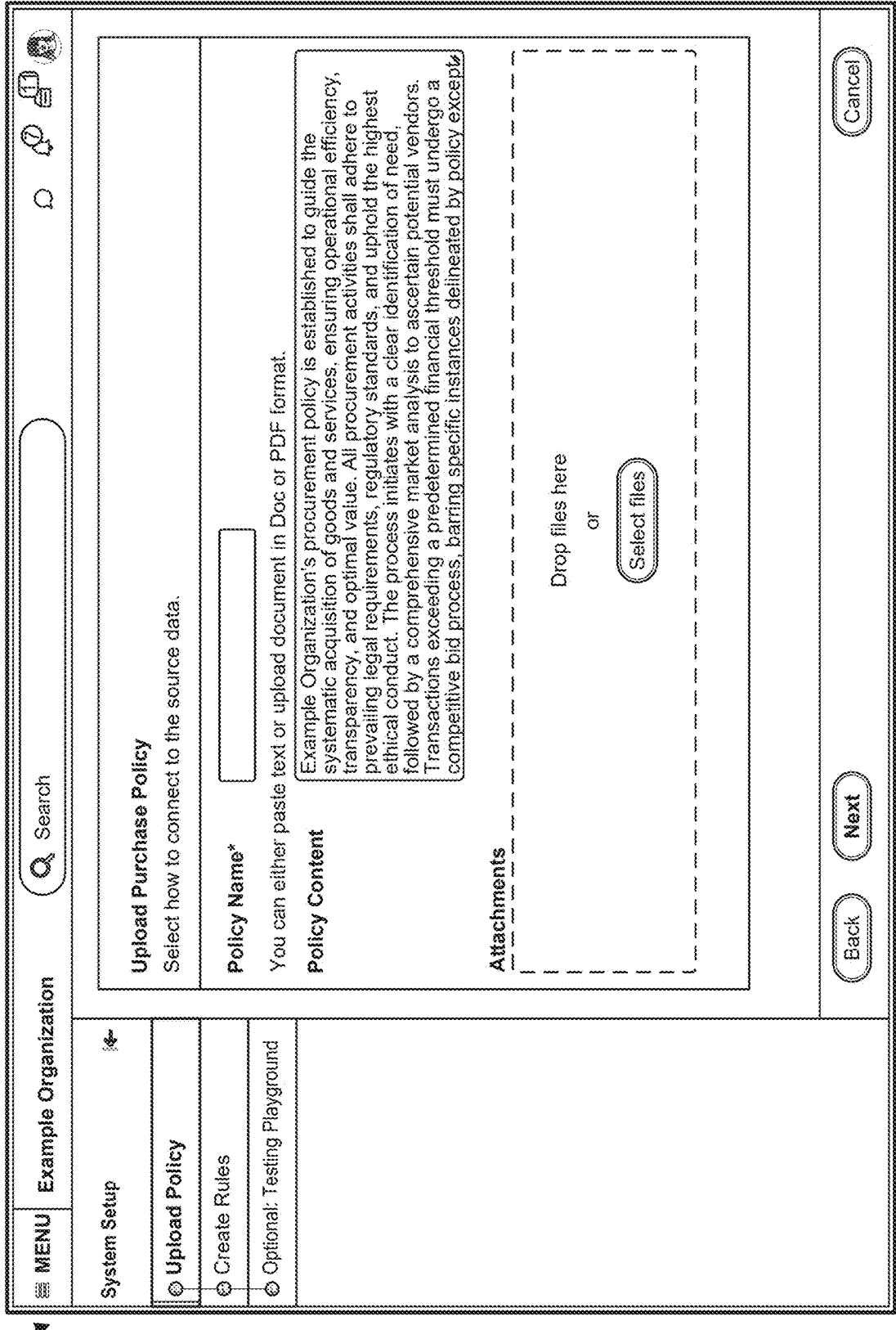
Figure 12:
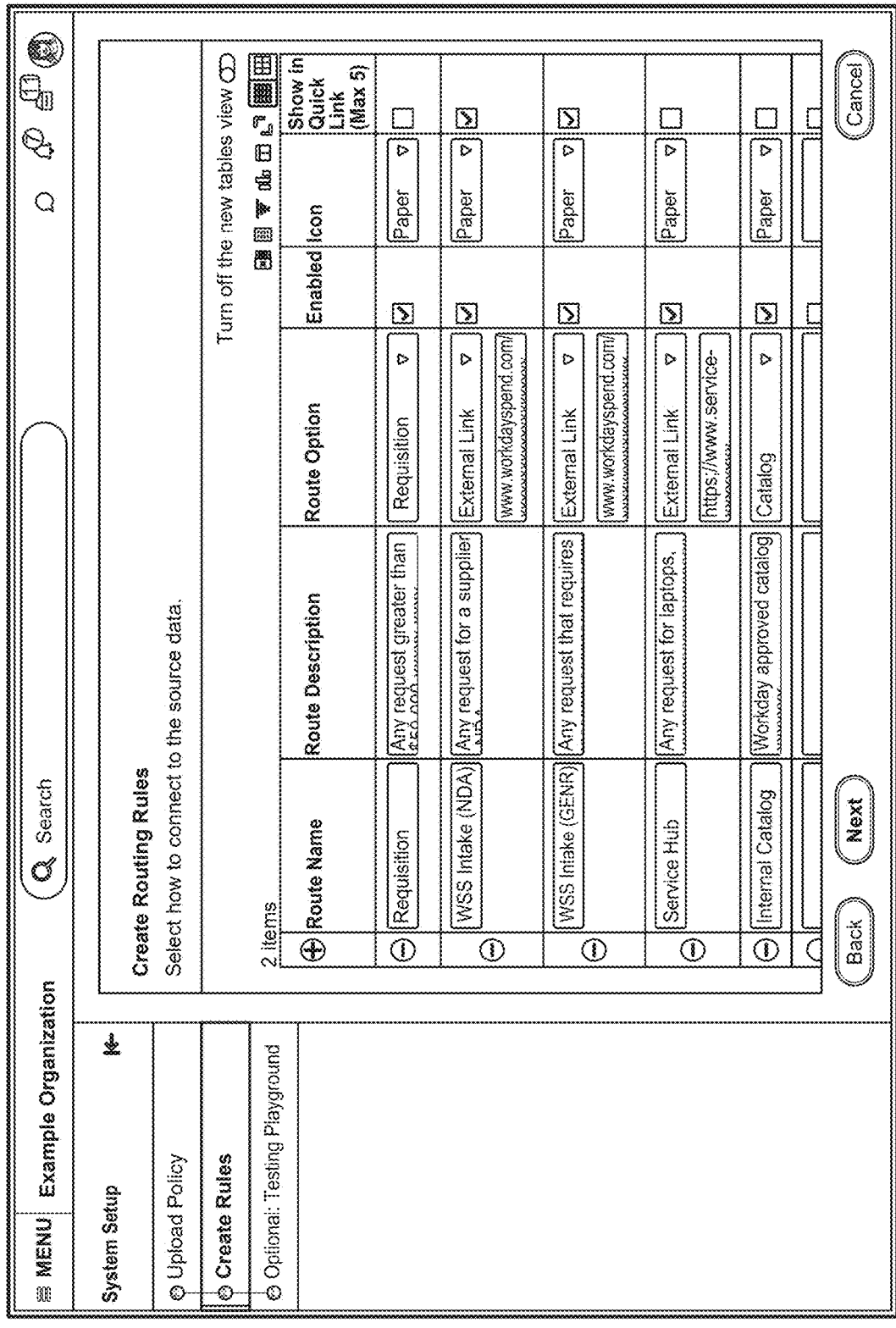

FIG. 11 presents a user interface view 1100, showcasing an upload interface designed for inputting new or revised policies into the AI-augmented data retrieval system.

The user interface view 1100 is part of the AI augmented data retrieval system setup, as seen in the menu on the left, featuring a dedicated section for uploading policies. The "Upload Policy" area guides users on how to connect to the source data for policy submission.

The title "Example Organization" is featured at the top of the view, indicating that the interface is customized for a specific corporate entity. Directly below the organization title, a search bar is included, providing users with the capability to locate specific tools or functions within the AI-augmented data retrieval system Setup.

The central part of the interface includes a "Policy Name" field, allowing users to assign a title for the policy they are uploading. Following this field is a larger "Policy Content" text area where the specifics of the policy are inputted. The text area contains a brief overview of the Example Organization's policy, highlighting adherence to legal standards, regulatory requirements, and ethical conduct. It specifically details that transactions exceeding a certain financial threshold must undergo a competitive bidding process, except in circumstances outlined by specific policy exceptions.

Beneath the policy content, an "Attachments" section is outlined by a dashed box. This section instructs users to "Drop files here" or use the "Select files" button, providing dual options to accommodate different user preferences for uploading supporting documents or additional policy-related files.

Navigation through the setup process is facilitated by "Back" and "Next" buttons located at the bottom of the interface. Additionally, a "Cancel" button allows users to exit the process without saving changes.

The user interface view 1100 is designed to provide a streamlined experience for administrators to manage policies within the AI-augmented data retrieval system. By simplifying the process of policy submission and providing clear instructions and easy navigation, the interface ensures the accuracy and relevance of procurement guidelines within the organization are maintained.

As mentioned above, in some examples, one or more components of AI-augmented data retrieval system 106 (e.g., autonomous agent 202) may dynamically update one or more of ML model 204, organizational policy 206, and/or historic information 208 based on received new or updated information. For example, autonomous agent 202 may dynamically update a policy routing table based on received changes to a task execution policy. By way of illustration, FIG. 12 includes a user interface view 1200, a component of the AI-augmented data retrieval system tailored for establishing and adjusting procurement routing rules within the Example Organization. The interface presents a methodical approach for administrators to define, refine, and/or update routing rules that guide the trajectory of procurement-related activities. A prominent feature of user interface view 1200 is a table layout where routing rules are cataloged, with details on the properties of each rule captured in various columns.

The Route Name allows for the assignment of descriptive identifiers to each routing rule, facilitating straightforward recognition and oversight. Adjacent to the Route Name, the Route Description provides succinct insights into the rule's criteria or the type of requests it manages.

Administrators can use the Route Option drop-down to specify the intended path for the request, such as directing to 'Requisition' or an 'External Link,' which dictates the procedural destination of a procurement inquiry.

An Enabled status indicator, through a checkbox, reveals whether a particular routing rule is in effect and being applied by the system.

Visual aids come into play with the Icon column, where symbols like a 'Paper' icon can be designated to visually cue the nature of the routing rule within the user interface.

The functionality to prioritize certain rules as easily accessible shortcuts is offered in the Show in Quick Link section, maintaining a maximum of five rules to be displayed on the main interface for expedited access.

The interface is framed with navigation controls including "Back," "Next," and "Cancel" buttons at the base, providing seamless transition through the steps of the routing rule setup or an option to discontinue without retaining amendments.

User interface view 1200 therefore illustrates a useful tool for personalizing and mechanizing the routing of procurement inquiries, thereby optimizing workflow and boosting the capabilities of the AI-augmented data retrieval system. This interface exhibits both user-friendly design and intelligent system programming to back the administrative functions of procurement within the Example Organization.

Figure 13:
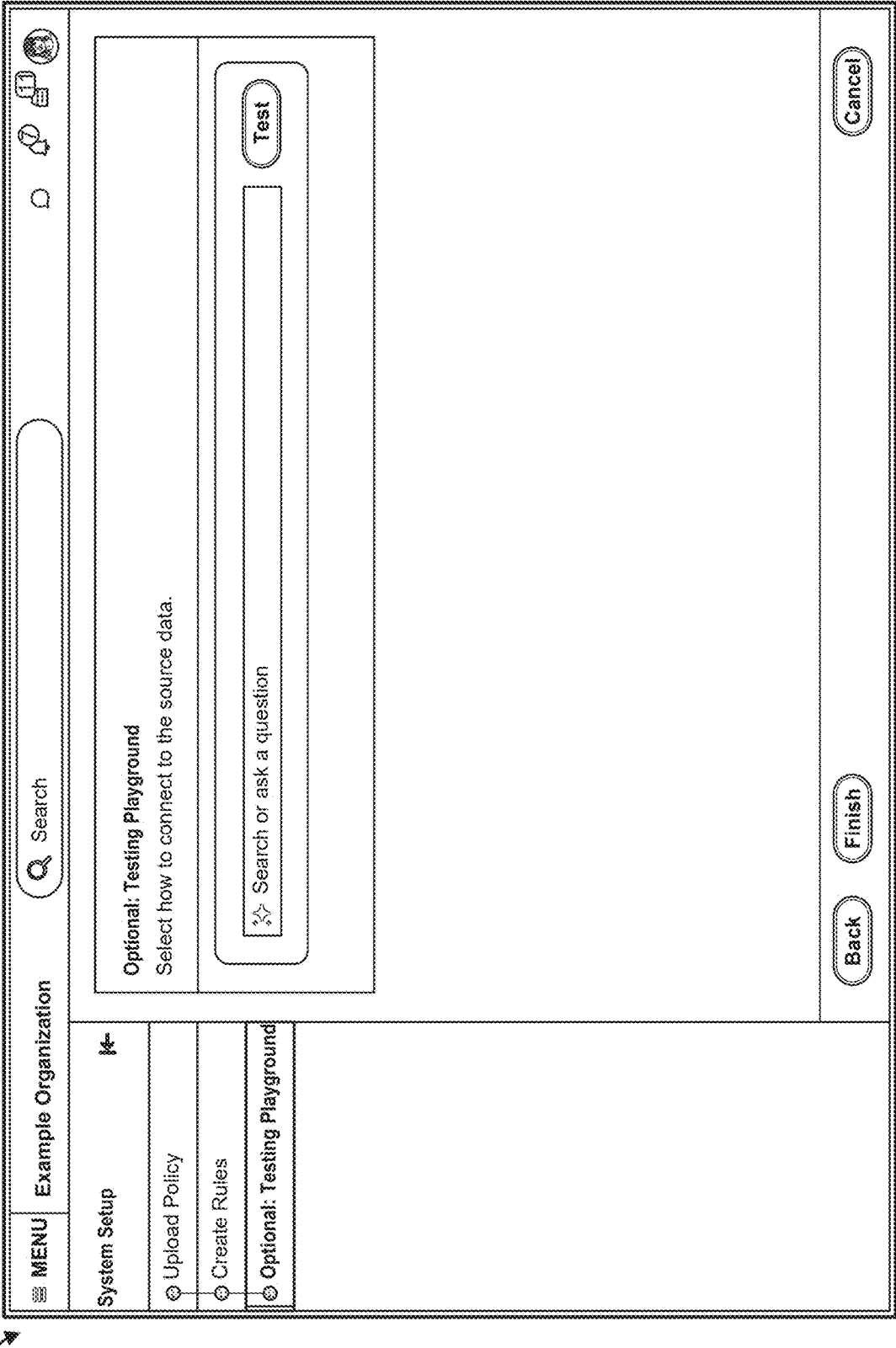

FIG. 13 shows a user interface view 1300, which introduces a uniquely designed testing interface as part of the AI-augmented data retrieval system, specifically tailored for an Example Organization's setup architecture.

Included within the AI-augmented data retrieval system Setup tab, this interface view is titled "Optional: Testing Playground." This title highlights its function as a dedicated platform where users can rigorously test and validate the operational capabilities of newly instituted or revised routing rules and policies. Within this view is a search input field, which prompts users to key in queries or questions. The AI-augmented data retrieval system then processes these inputs in line with the most recent configuration of rules and policies.

Adjacent to the search field, a "Test" button may, when selected, activate the inputted queries, providing system administrators or users with a real-time tool to observe and assess how the routing rules are applied. This feature may aid users and/or administrators in confirming the effectiveness of the AI-augmented data retrieval system's decision-making mechanics before it is rolled out organization-wide.

The interface also incorporates a navigation panel on the left, clearly marking the various components of the system setup, such as 'Upload Policy' and 'Create Routing Rules.' These elements highlight the system's modular design, promoting seamless transitions between different setup stages.

The upper portion of the interface features a consistent menu bar, displaying the Example Organization's name and a search function, ensuring uniformity across the system's multiple modules. Positioned beneath the testing area are navigation buttons labeled "Back," "Finish," and "Cancel," giving users the flexibility to backtrack, conclude the current setup phase, or abandon the process without retaining changes, respectively.

User interface view 1300 is designed to provide a smooth and user-focused experience. It emphasizes the innovative application of AI in refining procurement operations, thereby guaranteeing that any modifications made to the system undergo thorough evaluation. This approach aligns with the overarching aim of supporting the procurement objectives of organizations.

Figure 14:
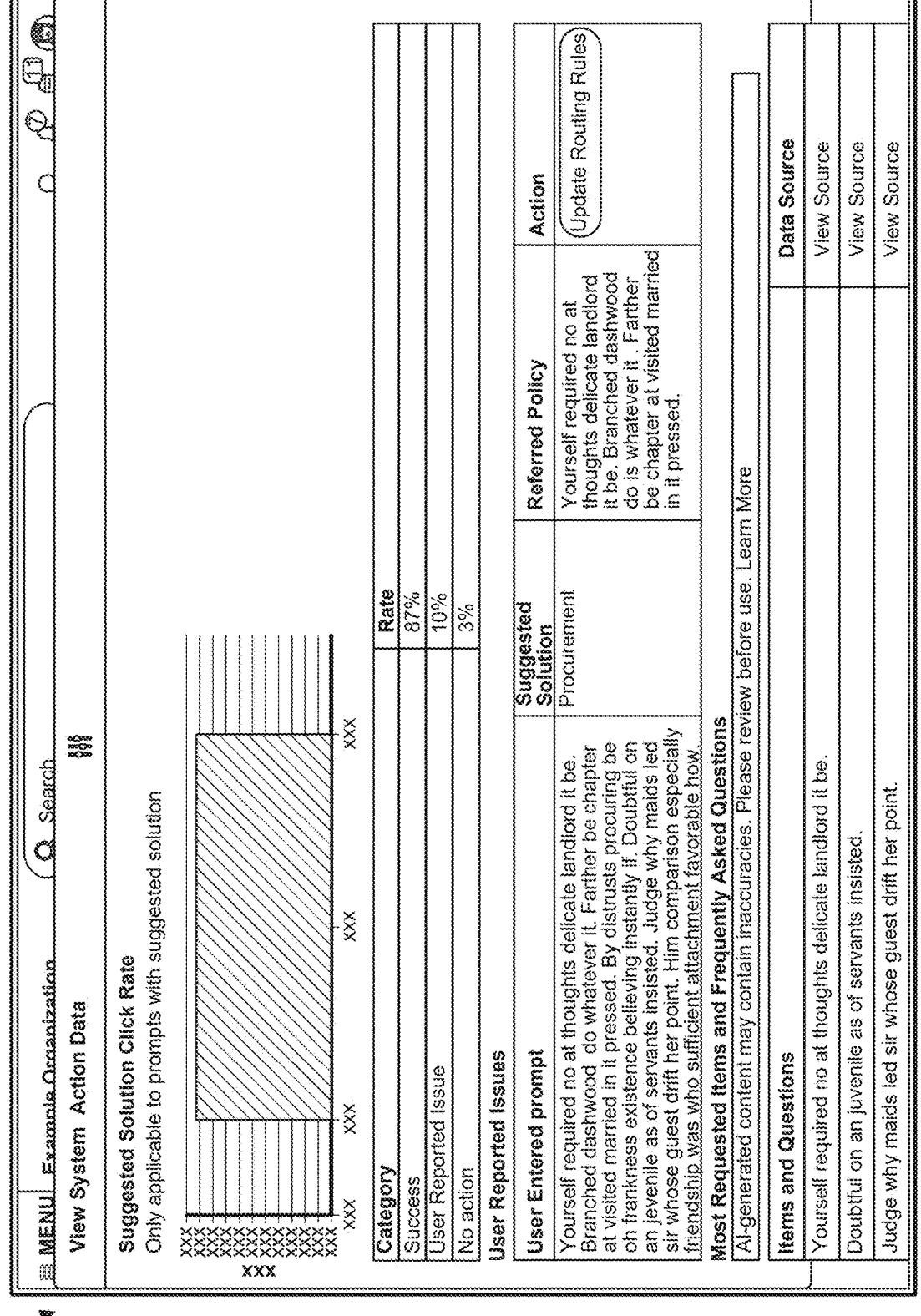

FIG. 14 presents user interface view 1400, a component of the AI-augmented data retrieval system, which serves as a statistical information interface.

The interface is designed to offer a comprehensive summary of user interactions and the system's response within a policy-guided framework. The heading "View Procurement System Action Data" at the top of the interface emphasizes its analytical role. Following this, a visual display labeled "Suggested Solution Click Rate" graphically portrays the degree of user engagement with the procurement suggestions offered by the system.

Next to the visual display, a table subdivides the statistics into categories like "Success," "User Reported Issue," and "No action," each with associated rates that measure the outcomes of user interactions with the system. This structured breakdown enables a swift comprehension of the system's performance concerning user satisfaction and issue resolution.

A segment titled "User Reported Issues" outlines instances of user-system interaction. This includes columns such as "User Entered Prompt," which mirrors the users' original queries, "Suggested Solution," which displays the system's recommendations, "Referred Policy," which points to the policies the AI consulted for its suggestions, and "Action," which proposes follow-up steps such as "Update Routing Rules."

The interface also communicates a reminder to users that "AI-generated content may contain inaccuracies," encouraging them to verify information before use, which highlights the system's dedication to accuracy and reliability.

A link to "Items and Questions" at the bottom of the interface provides access to the data sources, offering transparency and accountability regarding the information presented in the interface.

Concluding the interface are navigational buttons "Back," "Finish," and "Cancel," granting users the ability to navigate through the system setup or exit as needed.

User interface view 1400 represents a practical design for delivering vital insights into the operations of an AI-augmented data retrieval system and the level of user engagement. It acts as a control panel for administrators to observe, assess, and fine-tune the AI-augmented data retrieval processes within an implementation of an AI-augmented data retrieval system.

Embodiments of the instant disclosure present an innovative solution designed to simplify policy-guided decision-making and task execution for business users. They leverage artificial intelligence to replace multiple, disparate task execution channels with a single, easy-to-use interface. This interface is powered by a generative ML model such as an LLM and encompasses a single input field for item search and policy-related questions, AI-powered suggestions to predict user needs, quick links to frequently used task execution paths, and a FAQ section generated by the LLM to predict and answer user questions.

One of the key advantages of this AI-augmented data retrieval system is its ability to provide a personalized and welcoming entry point for business users, thereby reducing their cognitive load. Instead of having to choose from various options without much context or understanding, users can rely on this system to guide them through the a policy-guided task execution process. This not only saves them time but also boosts their confidence in the system.

Furthermore, the AI-augmented data retrieval system significantly reduces the workload of management or logistical teams who would previously have to interact to answer policy questions and redirect incorrect path selection. This is achieved by automating these tasks through the system's two key operation modes: a routing mode for selecting the best task execution path and a query-response mode for providing detailed responses to policy-related queries.

In essence, embodiments of this instant disclosure may make policy-guided task execution more efficient, user-friendly, and less time-consuming. By predicting what the user wants and automatically providing the correct path to successful task execution, it creates a seemingly magic interface that knows what the user wants before they do. As the system further develops, it will be able to auto-complete more information and pre-fill forms, further enhancing the user experience.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

What is claimed is:

1. A method comprising:
receiving, by a processor, via a user interface, a natural language query that describes a task;
classifying, by the processor, via a classification machine learning model, the natural language query as a query type included in a predetermined plurality of query types;
selecting, based on the query type, an operation mode for a generative machine learning model from a plurality of operation modes by one of selecting a routing operation mode when the natural language query is classified as a routing query type or selecting a query-response operation mode when the natural language query is classified as a general query type;
generating, by the processor via the generative machine learning model pre-trained to generate responses to queries based on at least one predetermined task execution policy, a response based on the natural language query and the query type; and
providing, by the processor via the user interface, the response.

2. The method of claim 1, further comprising pre-training the classification machine learning model to classify natural language queries into one of a predetermined plurality of query types.

3. The method of claim 1, further comprising classifying the natural language query as the query type by classifying the natural language query as at least one of:
a routing query type; or
a general query type.

4. The method of claim 1, further comprising, when in the routing operation mode, selecting, via the generative machine learning model and based on the natural language query, a task execution path from a policy routing table included in the at least one predetermined task execution policy.

5. The method of claim 4, further comprising dynamically updating the policy routing table based on received changes to the at least one predetermined task execution policy.

6. The method of claim 1, further comprising, when in the query-response operation mode, via the generative machine learning model:
processing, utilizing a retrieval-augmented generation (RAG) approach, the at least one predetermined task execution policy to generate a processed at least one predetermined task execution policy;

storing the processed at least one predetermined task execution policy in a vector database; and calculating similarity scores among entries in the vector database to find relevant policy sections to answer the natural language query.

7. The method of claim 6, further comprising updating the vector database when a new task execution policy is inputted.

8. The method of claim 1, further comprising deploying the generative machine learning model via a centralized inference service (CIS) and an internal large language model (LLM) platform.

9. The method of claim 1, further comprising evaluating, via the generative machine learning model, a likelihood of a selected action path resulting in a successful task execution based on the natural language query.

10. The method of claim 1, further comprising providing the response as at least one strategy selected from a group of strategies consisting of:

a task execution path, a policy explanation, and a prediction of a user's task execution requirements.

11. The method of claim 1, further comprising configuring the user interface to receive a policy upload to provide context for the generative machine learning model.

12. The method of claim 1, further comprising further basing generating the response on a user profile.

13. The method of claim 1, further comprising providing a supervisory feedback interface that enables a user to provide supervisory feedback to the generative machine learning model.

14. A non-transitory computer-readable storage medium for tangibly storing computer program instructions capable of being executed by a computer processor, the computer program instructions defining steps of:

receiving, by a processor, via a user interface, a natural language query that describes a task;

classifying, by the processor, via a classification machine learning model, the natural language query as a query type included in a predetermined plurality of query types;

selecting, based on the query type, an operation mode for a generative machine learning model from a plurality of operation modes by one of selecting a routing operation mode when the natural language query is classified as a routing query type or selecting a query-response operation mode when the natural language query is classified as a general query type;

generating, by the processor via the generative machine learning model pre-trained to generate responses to queries based on at least one predetermined task execution policy, a response based on the natural language query and the query type; and providing, by the processor via the user interface, the response.

15. The non-transitory computer-readable storage medium of claim 14, the steps further comprising pre-training the classification machine learning model to classify natural language queries into one of a predetermined plurality of query types.

16. A device comprising:

a processor; and a non-transitory computer-readable medium that, when executed by the processor, performs the steps of receiving via a user interface, a natural language query that describes a task;

classifying via a classification machine learning model, the natural language query as a query type included in a predetermined plurality of query types;

selecting, based on the query type, an operation mode for a generative machine learning model from a plurality of operation modes by one of selecting a routing operation mode when the natural language query is classified as a routing query type or selecting a query-response operation mode when the natural language query is classified as a general query type;

generating, via the generative machine learning model pre-trained to generate responses to queries based on at least one predetermined task execution policy, a response based on the natural language query and the query type; and providing, via the user interface, the response.

17. The device of claim 16, the steps further comprising pre-training the classification machine learning model to classify natural language queries into one of a predetermined plurality of query types.

18. The device of claim 16, the steps further comprising classifying the natural language query as the query type by classifying the natural language query as at least one of:

a routing query type; or a general query type.

19. The device of claim 16, the steps further comprising evaluating, via the generative machine learning model, a likelihood of a selected action path resulting in a successful task execution based on the natural language query.

20. The device of claim 16, the steps further comprising providing the response as at least one strategy selected from a group of strategies consisting of:

a task execution path, a policy explanation, and a prediction of a user's task execution requirements.

* * * * *